United States Patent
Ui et al.

(10) Patent No.: US 7,887,724 B2
(45) Date of Patent: Feb. 15, 2011

(54) HEAT-FOAMABLE SHEET, METHOD FOR MANUFACTURING THE SAME, FOAMING FILLER MEMBER, AND METHOD FOR FILLING INNER SPACE OF HOLLOW MEMBER

(75) Inventors: Takehiro Ui, Osaka (JP); Yoshiaki Mitsuoka, Osaka (JP); Mitsuo Matsumoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 224 days.

(21) Appl. No.: 11/519,791

(22) Filed: Sep. 13, 2006

(65) Prior Publication Data

US 2007/0057396 A1 Mar. 15, 2007

(30) Foreign Application Priority Data

Sep. 14, 2005 (JP) ............................. 2005-267067

(51) Int. Cl.
*B29C 43/22* (2006.01)
(52) U.S. Cl. .................... 264/45.8; 264/45.1; 264/46.6; 277/316
(58) Field of Classification Search ................ 264/45.8, 264/45.1, 46.6; 277/316
See application file for complete search history.

(56) References Cited

U.S. PATENT DOCUMENTS

| 5,806,915 A | 9/1998 | Takabatake |
| 5,979,902 A * | 11/1999 | Chang et al. ................ 277/316 |
| 6,455,146 B1 * | 9/2002 | Fitzgerald ................ 428/318.4 |
| 7,452,927 B2 * | 11/2008 | Hayes ........................ 523/223 |

| 2002/0091171 A1 * | 7/2002 | Blank et al. .................... 522/42 |

FOREIGN PATENT DOCUMENTS

| EP | 1666228 | 6/2006 |
| GB | 833488 | 4/1960 |

(Continued)

OTHER PUBLICATIONS

"Manual for Calendering Equipments for Plastics, Rubber" Japan Vinyl Goods Manufacture's Association, May 15, 1972, Kogyo Chosakai Publishing Co. Ltd., pp. 48-59.

*Primary Examiner*—Matthew J. Daniels
*Assistant Examiner*—Jacob Thomas Minskey
(74) *Attorney, Agent, or Firm*—Jean C. Edwards, Esq.; Akerman Senterfitt LLP

(57) ABSTRACT

There are provided a foaming filler member which allows, even when the inner space of a hollow member has a protruding space, easy filling of the protruding space without using an extra member, a heat-foamable sheet used for the foaming filler member, a method for manufacturing the heat-foamable sheet, and a method for filling the inner space of the hollow member. A heat-foamable sheet which extends in one direction when heated at 100 to 130° C. for 20 minutes and has an extension ratio of 5 to 50% in the extension direction is manufactured by stretch-forming a heat-foamable material. Even when the inner space has the protruding space, the protruding space can be easily filled at low cost without using an extra member by using the heat-foamable sheet as the foaming filler member, disposing the foaming filler member in the main space of the inner space, and foaming it such that the extending direction of the heat-foamable sheet is oriented toward the protruding space.

1 Claim, 4 Drawing Sheets

FOREIGN PATENT DOCUMENTS

| | | |
|---|---|---|
| JP | S62-062882 | 3/1987 |
| JP | 01-148521 | 6/1989 |
| JP | 06-278145 | 10/1994 |
| JP | 2721327 | 11/1997 |
| JP | 2001-114037 | 4/2001 |
| JP | 2002-79955 | 3/2002 |
| JP | 2002-173049 | 6/2002 |
| JP | 2004-22014 | 1/2004 |
| JP | 2004-252169 | 9/2004 |
| JP | 2004-341199 | 12/2004 |

\* cited by examiner

HEAT-FOAMABLE SHEET, METHOD FOR MANUFACTURING THE SAME, FOAMING FILLER MEMBER, AND METHOD FOR FILLING INNER SPACE OF HOLLOW MEMBER

CROSS REFERENCE TO RELATED APPLICATION

This application claims priority from Japanese Patent Appln. No. 2005-267067, filed Sep. 14, 2005, the contents of which are herein incorporated by reference in their entirety.

BACKGROUND OF THE INVENTION

1. Field of the Invention

The present invention relates to a heat-foamable sheet, a method for manufacturing the same, a foaming filler member, and a method for filling the inner space of a hollow member.

2. Description of Related Art

It has been conventionally known to fill a foamed body in a hollow member formed as the closed cross section of an automotive pillar or the like for the purpose of preventing the vibration and noise of an engine or wind noise from being transmitted into the vehicle interior of an automobile.

For example, it has been proposed to form such a foamed body by molding a foamable material into a specified configuration by injection or extrusion and foaming the molded material at 110 to 190° C. (see, e.g., Japanese Patent No. 2721327). It has also been proposed to, e.g., form a foamed body by molding a composition containing 30 to 42 parts by weight of rubber based on 100 parts by weight of the entire composition into a specified configuration and foaming the molded composition at 140 to 170° C. (see, e.g., Japanese Unexamined Patent Publication No. 62-62882).

It has been proposed to, e.g., form grooves in a foamable base material and form projections in a holder body such that the grooves and the projections form a foamed body guide and thereby fill a foamed body in the clearance between the corner portion of a hollow chamber and the apex portion of the foamable base material (see, e.g., Japanese Unexamined Patent Publication No. 2001-114037).

It has also been proposed to, e.g., fill a foamed body in an irregularly shaped hollow chamber having a protruding region. Specifically, a hollow chamber shutoff implement for shutting off the hollow chamber by foaming a foamable base material is provided with two holder plates for supporting the foamable base material and disposed in the hollow chamber. In the protruding region of the hollow chamber, the foamable base material has both side faces thereof supported by the two holder plates, while having one side face thereof supported by one of the holder plates in the region of the hollow chamber other than the protruding region. Then, the foamable base material is foamed such that the protruding region of the hollow chamber is filled with the resulting foamed body (see, e.g., Japanese Unexamined Patent Publication No. 2004-252169).

However, a foamable material molded by injection or extrusion such as disclosed in Japanese Patent No. 2721327 or Japanese Unexamined Patent Publication No. 62-62882 equally foams in all directions through heating. When the inner space has a configuration which is more protruding in one direction than in the opposite direction relative to the position of the foamable material disposed therein, a problem occurs in that the portion of the inner space protruding in one direction cannot be filled satisfactorily.

On the other hand, even when the inner space has the projecting portion mentioned above, the use of the foamed body guide disclosed in Japanese Unexamined Patent Publication No. 2001-114037 or the two holder plates disclosed in Japanese Unexamined Patent Publication No. 2004-252169 allows the protruding space portion to be filled with the foamed body. However, an extra member for filling the foamed body in the protruding space portion becomes necessary, which results in an intricate structure and leads to the problem of higher manufacturing cost.

SUMMARY OF THE INVENTION

It is an object of the present invention to provide a foaming filler member which allows, even when an inner space has a protruding space, easy filling of the protruding space without using an extra member, a heat-foamable sheet used for the foaming filler member, a method for manufacturing the heat-foamable sheet, and a method for filling the inner space of a hollow member.

To attain the above-mentioned object, a heat-foamable sheet according to the present invention extends in one direction when heated at 100 to 130° C. for 20 minutes and has an extension ratio of 5 to 50% in the extending direction.

Preferably, the heat-foamable sheet according to the present invention is formed by stretching a heat-foamable material.

In the heat-foamable sheet according to the present invention, the heat-foamable material preferably contains a polymer as a main component and a foaming agent, the heat-foamable sheet being preferably formed by heating the heat-foamable material to a temperature less than a decomposition temperature of the foaming agent and rolling the heated heat-foamable material.

Preferably, the heat-foamable sheet according to the present invention is formed by calendering.

In the heat-foamable sheet according to the present invention, the calendering preferably uses: a plurality of calender rolls arranged in adjacent relation to have respective nip portions formed therebetween; and a draw roll disposed in downstream spaced-apart relation to the calender roll which is disposed most downstream in a direction of transport of the heat-foamable material, in the adjacent calendar rolls each other, a rotating speed of the calender roll which is disposed downstream is preferably set to be equal to or higher than a rotating speed of the other calender roll which is disposed upstream, and a rotating speed of the draw roll is preferably set to be equal to or higher than a rotating speed of the one of the calender rolls which is disposed most downstream.

A method for manufacturing a heat-foamable sheet according to the present invention comprises the steps of: preparing a heat-foamable material by mixing a polymer as a main component and a foaming agent; and stretch-forming the heat-foamable material into the heat-foamable sheet such that the heat-foamable sheet extends in one direction when heated at 100 to 130° C. for 20 minutes and has an extension ratio of 5 to 50% in the extending direction.

In the method for manufacturing a heat-foamable sheet according to the present invention, the step of stretch-forming the heat-foamable material preferably includes heating the heat-foamable material to a temperature less than a decomposition temperature of the foaming agent and rolling the heated heat-foamable material.

In the method for manufacturing a heat-foamable sheet according to the present invention, the step of stretch-forming the heat-foamable material preferably includes calendering the heat-foamable sheet.

In the method for manufacturing a heat-foamable sheet according to the present invention, the calendering preferably uses: a plurality of calender rolls arranged in adjacent relation to have respective nip portions formed therebetween; and a draw roll disposed in downstream spaced-apart relation to the calender roll which is disposed most downstream in a direction of transport of the heat-foamable material, in the adjacent calendar rolls each other, a rotating speed of the calender roll which is disposed downstream is preferably set to be equal to or higher than a rotating speed of the other calender roll which is disposed upstream, and a rotating speed of the draw roll is preferably set to be equal to or higher than a rotating speed of the one of the calender rolls which is disposed most downstream.

A foaming filler member according to the present invention comprises a heat-foamable sheet which extends in one direction when heated at 100 to 130° C. for 20 minutes and has an extension ratio of 5 to 50% in the extending direction.

Preferably, the foaming filler member according to the present invention further comprises a fixing member which is attached to the heat-foamable sheet and capable of fixing the heat-foamable sheet in an inner space of a hollow member.

A method for filling an inner space of a hollow member according to the present invention is a method for filling an inner space of a hollow member by heat-foaming a foaming filler member, wherein the inner space of the hollow member has a main space and a protruding space protruding from the main space which are formed in mutually connecting relation, and the foaming filler member comprising a heat-foamable sheet which extends in one direction when heated at 100 to 130° C. for 20 minutes and has an extension ratio of 5 to 50% in the extending direction is disposed in the main space of the inner space such that the extending direction of the heat-foamable sheet is oriented toward the protruding space and heat-foamed.

The heat-foamable sheet according to the present invention extends in one direction when it is heated at 100 to 130° C. for 20 minutes. Therefore, even when the inner space of a hollow member has a protruding space which is protruding from the main space thereof, the use of the heat-foamable sheet for the foaming filler member allows easy filling of the protruding space at low cost without using an extra member by disposing the foaming filler member in the main space such that the extending direction of the heat-foamable sheet is oriented toward the protruding space and foaming it.

DESCRIPTION OF THE PREFERRED EMBODIMENTS

Figure 1:
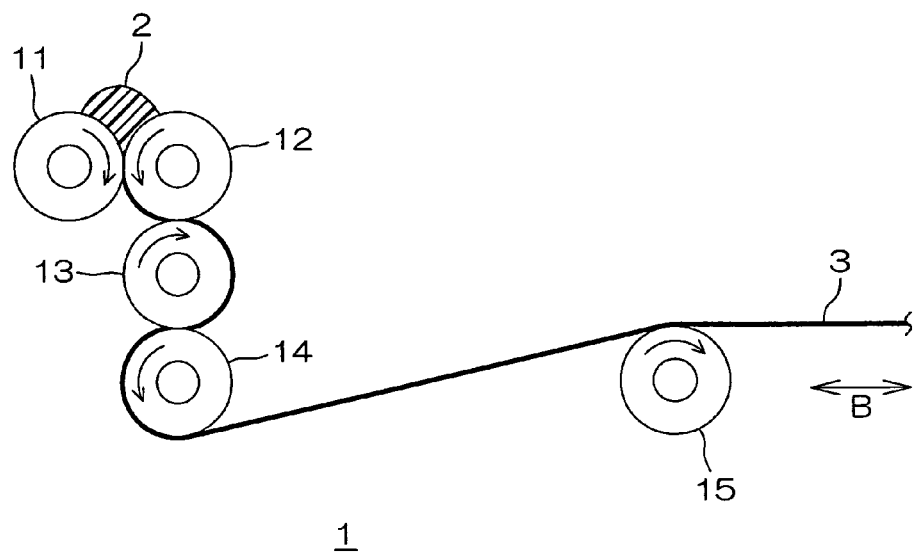
FIG. 1 is a schematic structural view of a calender roll apparatus according to an embodiment for manufacturing a heat-foamable sheet of the present invention.

A heat-foamable sheet according to the present invention is obtained by forming a heat-foamable material which foams through heating (e.g., at 150 to 220° C.) into a sheet-like configuration.

The heat-foamable material contains a polymer as a main component and a foaming agent for foaming the polymer. The polymer is not particularly limited. Examples of the polymer include a resin such as an ethylene-vinyl acetate copolymer, polyethylene, polypropylene, polyester, polyvinyl butyral, polyvinyl chloride, polyamide, or polyketone, and rubber such as styrene-butadiene rubber (SBR) or polybutadiene rubber (RB). Preferably, the ethylene-vinyl acetate copolymer is used as the polymer. By using the ethylene-vinyl acetate copolymer, the foaming ratio of the heat-foamable material can be increased. Among these polymers, a polymer preferably having a melting point in the range of 60 to 120° C., more preferably 80 to 100° C., is used selectively. When the melting point is less than 60° C., the polymer develops viscosity so that the handling thereof occasionally becomes difficult even at a room temperature. When the melting point exceeds 120° C., a machining temperature needs to be increased and the foaming agent might be decomposed during machining. The melting point is measured by using a DSC (differential scanning calorimeter).

Among these polymers, one or two or more can be selected appropriately for use.

Examples of the foaming agent include an inorganic foaming agent and an organic foaming agent. Examples of the inorganic foaming agent include ammonium carbonate, ammonium hydrogen carbonate, ammonium hydrogen sodium, ammonium nitrite, sodium borohydride, and azides.

Examples of the organic foaming agent include an azo compound such as azodicarbonamide, barium azodicarboxylate, azobisisobutyronitrile, or azodicarboxylic acid amide, a nitroso compound such as N,N'-dinitrosopentamethylenetetramine, N,N'-dimethyl-N,N'-dinitrosoterephthalamide, or trinitrotrimethyltriamine, a hydrazide compound such as 4,4'-oxybis(benzenesulfonylhydrazide), p-toluenesulfonylhydrazide, diphenylsulfon-3,3'-disulfonylhydrazide, or allylbis (sulfonylhydrazide), a semicarbazide compound such as p-toluylenesulfonylsemicarbazide or 4-4'-oxybis(benzenesulfonylsemicarbazide), an alkane fluoride such as trichloromonofluoromethane or dichloromonofluoromethane, and a triazole compound such as 5-morpholyl-1,2,3,4-thiatriazole.

Among these foaming agents, a foaming agent which is decomposed at a temperature not less than the melting point of the polymer to generate gas and hardly foams during the formation of a heat-foamable material, which will be described later, is selected appropriately in accordance with the composition thereof. Preferably, a foaming agent which foams (is decomposed) at 140 to 180° C. is used. More specifically, 4,4'-oxybis(benzenesulfonylhydrazide) is used.

Among these foaming agents, one or two or more can be selected appropriately for use. The mixing ratio of the foaming agent or agents is not particularly limited. For example, the mixing ratio of the foaming agent or agents with respect to 100 parts by weight of the polymer is 5 to 50 parts by weight, preferably 10 to 30 parts by weight.

Preferably, the mixing amount of the foaming agent or agents is in a range which provides a foaming ratio of about 5 to 25, preferably about 10 to 20, and substantially allows the formation of closed-cell foam during the foaming of the heat-foamable sheet. When the mixing amount of the foaming agent or agents is excessively small, the heat-foamable sheet does not sufficiently foam. When the mixing amount of the foaming agent or agents is excessively large, a clearance due to resin drip is formed in a foamed body obtained as a result of foaming. In either case, the filling property is degraded.

To efficiently foam, crosslink, and cure the polymer, e.g., a crosslinking agent, a foaming assistant, and the like are further mixed appropriately in the heat-foamable material.

The crosslinking agent is not particularly limited. As an example of the crosslinking agent, a radical generator which is decomposed by heating to generate free radicals and cause intermolecular or intramolecular crosslinkage can be listed. More specifically, an organic peroxide such as dicumyl peroxide, 1,1-ditertiarybutylperoxy-3,3,5-trimethylcyclohexane, 2,5-dimethyl-2,5-ditertiarybutylperoxyhexane, 2,5-dimethyl-2,5-ditertiarybutylperoxyhexyne, 1,3-bis(t-butylperoxyisopropyl)benzene, tertiarybutylperoxyketone, or tertiarybutylperoxybenzoate or the like can be listed.

When the polymer is vulcanizable, a vulcanizer can be used as the crosslinking agent. Such a vulcanizer is not particularly limited. Examples of the vulcanizer include sulfur, sulfur compounds, selenium, magnesium oxides, lead monoxide, zinc oxides, polyamines, oximes, nitroso compounds, resins, and ammonium salts.

Among these crosslinking agents, one or two or more can be selected appropriately for use. The mixing ratio of the crosslinking agent or agents is not particularly limited. For example, the mixing ratio of the crosslinking agent or agents to with respect to 100 parts by weight of the polymer is 0.1 to 10 parts by weight, preferably 0.5 to 7 parts by weight.

When the vulcanizer is used, a vulcanization accelerator can be used in combination. Examples of the vulcanization accelerator include dithiocarbamic acids, thiazoles, guanidines, sulfene amides, thiurams, xanthic acids, aldehyde ammonias, aldehyde amines, and thioureas. Among these vulcanization accelerators, one or two or more can be selected appropriately for use. The mixing ratio of the vulcanization accelerator or accelerators with respect to 100 parts by weight of the polymer is 0.1 to 5 parts by weight.

Instead of the vulcanizer, a known vulcanization retardant represented by an organic acid or an amine or the like can also be mixed appropriately for the purpose of adjusting formability.

The foaming assistant is not particularly limited. For example, a known foaming assistant may be selected depending on the type of the foaming agent. Specific examples of the foaming assistant include a urea compound containing urea as a main component, a metal oxide such as a zinc oxide or a lead oxide, a higher fatty acid such as a salicylic acid or a stearic acid, and a metal salt of the higher fatty acid. Preferably, a higher fatty acid metal salt is used.

Among these foaming assistants, one or two or more can be selected appropriately for use. The mixing ratio of the foaming assistant or assistants is not particularly limited. For example, the mixing ratio of the vulcanization assistant or assistants with respect to 100 parts by weight of the polymer is 1 to 20 parts by weight, preferably 5 to 10 parts by weight.

In the heat-foamable material, a known additive such as, e.g., a stabilizer, a reinforcer, a filler, a softener, or a lubricant can be mixed appropriately depending on the purpose and application thereof to an extent that does not affect the physical properties of the obtained foamed body. When necessary, a known additive such as, e.g., a plasticizer, an age resistor, an antioxidant, a pigment, a colorant, a fungicide, or a fire retardant can further be mixed appropriately in the heat-foamable material.

The heat-foamable material is prepared by, e.g., mixing the individual components described above at the mixing ratios shown above and then kneading the mixture by using, e.g., a mixing roll, a press kneader, or the like.

The heat-foamable material is prepared to have a viscosity preferably ranging from 100 to 10000 Pa·s (120° C.).

The heat-foamable sheet can be obtained by stretch-forming the heat-foamable material thus prepared into a sheet-like configuration.

The stretch-forming of the heat-foamable material is not particularly limited. For example, calendering is used to stretch-form the heat-foamable material.

FIG. 1 is a schematic structural view of a calender roll apparatus for manufacturing the heat-foamable sheet of the present invention according to an embodiment. It is assumed herein that such terms as "upward," "downward," "under," "left (one side)," "leftward," "right (the other side)," and "rightward," which will be used in the following description, indicate positions and directions on the paper face with FIG. 1.

Next, a description will be given to a method for rolling a heat-foamable material 2 by using a calender roll apparatus 1 shown in FIG. 1 and thereby calender-forming it into a heat-foamable sheet 3.

In FIG. 1, the calender roll apparatus 1 comprises: a first calendar roll 11; a second calender roll 12 disposed on the horizontally right side of the first calender roll 11 in adjacent opposing relation thereto; a third calender roll 13 disposed vertically under the second calender roll 12 in adjacent opposing relation thereto; a fourth calender roll 14 disposed vertically under the third calender roll 13 in adjacent opposing relation thereto; and a draw roll 15 disposed on the horizontally right side of the fourth calender roll 14 in spaced-apart relation thereto. The plurality of calender rolls (first calender roll 11, second calender roll 12, third calender roll 13 and fourth calender roll 14) are arranged in an inverted L-shaped configuration.

The first calender roll 11 is composed of a metal roll and disposed to be clockwise rotatable. The rotating speed of the first calender roll 11 is set to a value in the range of 1 to 10 m/min, preferably 2 to 5 m/min. The first calender roll 11 is heated by a heat source not shown. The surface temperature of the first calender roll 11 is set to a value less than, e.g., the decomposition temperature of a foaming agent. For example, the surface temperature of the first calender roll 11 is set to be not less than the melting point of a polymer and not more than a temperature 50° C. higher than the melting point, preferably not more than a temperature 30° C. higher than the melting point, more preferably not more than a temperature 20° C. higher than the melting point. More specifically, the surface temperature of the first calender roll 11 is set to a value in the range of 80 to 110° C., preferably, 90 to 100° C.

The first calender roll 11 is also formed to have a diameter in the range of, e.g., 100 to 1000 mmφ, preferably 150 to 700 mmφ, and a width (length in the axial direction thereof) in the range of, e.g., 200 to 3000 mm, preferably 300 to 2000 mm.

The second calender roll 12 is composed of a metal roller having the same diameter and the same width as the first calender roll 11 and disposed to be anticlockwise rotatable. The rotating speed of the second calender roll 12 is set to be equal to or higher than that of the first calender roll 11. That is, when the rotating speed of the first calender roll 11 is assumed to be 100%, the rotating speed of the second calender roll 12 is set to be, e.g., 100 to 150%, preferably 105 to 120% of the rotating speed of the first calender roll 11. More specifically, the rotating speed of the second calender roll 12 is set to a value in the range of 1 to 10 m/min, preferably 2.1 to 6 m/min. The second calender roll 12 is heated by the heat source not shown. The surface temperature of the second calender roll 12 is set to a value less than, e.g., the decomposition temperature of the foaming agent. For example, the surface temperature of the second calender roll 12 is set to be not less than the melting point of the polymer and not more than a temperature 50° C. higher than the melting point, preferably not more than a temperature 30° C. higher than the melting point, more preferably not more than a temperature 20° C. higher than the melting point. That is, when the surface temperature of the first calender roll 11 is assumed to be 100%, the surface temperature of the second calender roll 12 is set to be, e.g., 90 to 110% of the surface temperature of the first calender roll 11, preferably substantially equal thereto. More specifically, the surface temperature of the second calender roll 12 is set to a value in the range of 80 to 110° C., preferably 85 to 100° C.

The first calender roll 11 and second calender roll 12 are horizontally opposed to each other to form the nearest portion therebetween (i.e., the respective contact portions of the individual rolls with a material passing; therethrough, which will be hereinafter referred to as nip portion). The dimension of the gap of the nip portion is 0.5 mm or more, preferably 1 to 20 mm, more preferably 1.5 to 10 mm. The first calender roll 11 and second calender roll 12 are arranged such that each of them rotates vertically downward, i.e., from a higher level to a lower level at the nip portion thereof. The first calender roll 11 and the second calender roll 12 are selected appropriately depending on the amount or viscosity of the heat-foamable material 2 introduced therebetween. The first calender roll 11 and the second calender roll 12 have been adjusted to roll the heat-foamable material 2 at, e.g., $10^2$ to $10^7$ N/m$^2$, preferably $10^3$ to $10^6$ N/m$^2$.

The third calender roll 13 is composed of a metal roll having the same diameter and the same width as the first calender roll 11 and disposed to be clockwise rotatable. The rotating speed of the third calender roll 13 is set to be equal to or higher than that of the second calender roll 12. That is, when the rotating speed of the second calender roll 12 is assumed to be 100%, the rotating speed of the third calender roll 13 is set to be 100 to 150%, preferably 105 to 120% of the rotating speed of the second calender roll 12. More specifically, the rotating speed of the third calender roll 13 is set to a value in the range of 1 to 10 m/min, preferably 2.4 to 7.5 m/min. The third calender roll 13 is heated by the heat source not shown. The surface temperature of the third calender roll 13 is set to a value less than the decomposition temperature of the foaming agent. For example, the surface temperature of the third calender roll 13 is set to be not less than the melting point of the polymer and not more than a temperature 50° C. higher than the melting point, preferably not more than a temperature 30° C. higher than the melting point, more preferably not more than a temperature 20° C. higher than the melting point. That is, when the surface temperature of the second calender roll 12 is assumed to be 100%, the surface temperature of the third calender roll 13 is set to be, e.g., 90 to 110% of the surface temperature of the second calender roll 12, preferably substantially equal thereto. More specifically, the surface temperature of the third calender roll 13 is set to a value in the range of 80 to 110° C., preferably 85 to 100° C.

The second calender roll 12 and the third calender roll 13 are vertically (perpendicularly) opposed to each other to have a nip portion formed therebetween. When the dimension of the gap of the nip portion of the first calender roll 11 and the second calender roll 12 is assumed to be 100%, the second calender roll 12 and the third calender roll 13 are arranged such that the dimension of the gap of the nip portion thereof is 10 to 100%, preferably 30 to 80%, within the range of 1 to 20 mm, preferably 1.5 to 10 mm. The second calender roll 12 and the third calender roll 13 are also arranged such that each of them rotates horizontally rightward, i.e., from left to right at the nip portion thereof. The second calender roll 12 and the third calender roll 13 have been adjusted to roll the heat-foamable material 2 at, e.g., $10^2$ to $10^7$ N/m$^2$, preferably $10^3$ to $10^6$ N/m$^2$.

The fourth calender roll 14 is composed of a metal roll having the same diameter and the same width as the first calender roll 11 and disposed to be anticlockwise rotatable. The rotating speed of the fourth calender roll 14 is set to be equal to or higher than that of the third calender roll 13. That is, when the rotating speed of the third calender roll 13 is assumed to be 100%, the rotating speed of the fourth calender roll 14 is set to be 100 to 150%, preferably 105 to 120% of the rotating speed of the third calender roll 13. More specifically, the rotating speed of the fourth calender roll 14 is set to a value in the range of 1 to 10 m/min, preferably 2.4 to 7.5 m/min. The fourth calender roll 14 is heated by a heat source not shown. The surface temperature of the fourth calender roll 14 is set to a value less than the decomposition temperature of the foaming agent. For example, the surface temperature of the fourth calender roll 14 is set to be not less than the melting point of the polymer and not more than a temperature 50° C. higher than the melting point, preferably not more than a temperature 30° C. higher than the melting point, more preferably not more than a temperature 20° C. higher than the melting point. That is, when the surface temperature of the third calender roll 13 is assumed to be 100%, the surface temperature of the fourth calender roll 14 is set to be, e.g., 90 to 110% of the surface temperature of the third calender roll 13, preferably substantially equal thereto. More specifically, the surface temperature of the fourth calender roll 14 is set to a value in the range of 80 to 110° C., preferably 90 to 100° C.

The third calender roll 13 and the fourth calender roll 14 are vertically (perpendicularly) opposed to each other to have a nip portion formed therebetween. When the dimension of the gap of the nip portion of the second calender roll 12 and the third calender roll 13 is assumed to be 100%, the third calender roll 13 and the fourth calender roll 14 are arranged such that the dimension of the gap between the respective nip portions thereof is 10 to 100%, preferably 30 to 80%, within the range of 1 to 20 mm, preferably 1.5 to 10 mm. The third calender roll 13 and the fourth calender roll 14 are also arranged such that each of them rotates horizontally leftward, i.e., from right to left at the nip portion thereof The third calender roll 13 and the fourth calender roll 14 have been adjusted to roll the heat-foamable material 2 at, e.g., $10^2$ to $10^7$ N/m$^2$, preferably $10^3$ to $10^6$ N/m$^2$.

The draw roll 15 draws off the heat-foamable material 2 that has been rolled by the plurality of calender rolls into a sheet-like configuration. The draw roll 15 is composed of a metal roll having the same diameter and the same width as the fourth calender roll 14 and disposed to be clockwise rotatable. The rotating speed of the draw roll 15 is set to be equal to or higher than that of the fourth calender roll 14. That is, when the rotating speed of the fourth calender roll 14 is assumed to be 100%, the rotating speed of the draw roll 15 is set to be 100 to 200%, preferably 100 to 120% of the rotating speed of the fourth calender roll 14. More specifically, the rotating speed of the draw roll 15 is set to a value in the range of 2.4 to 15 m/min, preferably 2.4 to 9 m/min. The surface temperature of the draw roll 15 is normally lower than that of the fourth calender roll 14. The temperature of the draw roll 15 is not particularly set and controlled to be substantially the same as an atmospheric temperature.

Next, a description will be given to a method for rolling the heat-foamable material 2 into the heat-foamable sheet 3 by using the calender roll apparatus 1.

First, the heat-foamable material 2 is introduced between the first calender roll 11 and the second calender roll 12 from above the respective nip portions thereof.

The amount of the heat-foamable material 2 introduced therebetween is, e.g., 0.1 to 50 kg/min, preferably 0.5 to 5 kg/min.

Next, the heat-foamable material 2 introduced between the first calender roll 11 and the second calender roll 12 is rolled between the nip portion thereof, while it is transported vertically downward by the rotation of the first calender roll 11 and the second calender roll 12, to be delivered out of the nip portion thereof.

The heat-foamable material 2 is rolled by the first calender roll 11 and the second calender roll 12 to have a thickness of, e.g., 0.5 mm or more, preferably 1 to 20 mm, more preferably 1.5 to 10 mm.

Then, the heat-foamable material 2 delivered out of the nip portion of the first calender roll 11 and the second calender roll 12 is transferred onto the surface of the second calender roll 12.

Then, the heat-foamable material 2 transferred onto the surface of the second calender roll 12 is fed into the nip portion of the second calender roll 12 and the third calender roll 13 by the rotation of the second calender roll 12 such that it is rolled, while being transported horizontally rightward by the rotation of the second calender roll 12 and the third calender roll 13, and delivered out of the nip portion thereof.

The heat-foamable material 2 is rolled by the second calender roll 12 and the third calender roll 13 to have a thickness of, e.g., 1 to 20 mm, preferably 1.5 to 10 mm.

Then, the heat-foamable material 2 delivered out of the nip portion of the second calender roll 12 and the third calender roll 13 comes off the surface of the second calender roll 12 to be transferred onto the surface of the third calender roll 13.

Then, the heat-foamable material 2 transferred onto the surface of the third calender roll 13 is fed into the nip portion of the third calender roll 13 and the fourth calender roll 14 by the rotation of the third calender roll 13 such that it is rolled, while being transported horizontally leftward by the rotation of the third calender roll 13 and the fourth calender roll 14, and delivered out of the nip portion thereof.

The heat-foamable material 2 is rolled by the third calender roll 13 and the fourth calender roll 14 to have a thickness of, e.g., 0.5 mm or more, preferably 1 to 20 mm, more preferably 1.5 to 10 mm.

Then, the heat-foamable material 2 delivered out of the nip portion of the third calender roll 13 and the fourth calender roll 14 comes off the surface of the third calender roll 13 to be transferred onto the surface of the fourth calender roll 14.

Subsequently, the heat-foamable material 2 transferred onto the surface of the fourth calender roll 14 reaches the lowermost portion of the outer circumference thereof with the rotation of the fourth calender roll 14 and is drawn off as the heat-foamable sheet 3 by the draw roll 15 as a result of the rotation thereof.

The heat-foamable sheet 3 drawn off by the draw roll 15 has a final thickness of, e.g., 1 to 20 mm, preferably 1.5 to 10 mm.

The heat-foamable sheet 3 may also be coated on a known base sheet or the like and obtained as a multilayer sheet.

As shown as a specimen in FIG. 2, the heat-foamable sheet 3 thus obtained extends in one direction, i.e., in the axial direction (which may be hereinafter referred to as "extending direction A") of the plurality of calender rolls when it is heated at, e.g., a temperature not less than the melting point of the polymer, more specifically at an arbitrary temperature selected from the range of 100 to 130° C. On the other hand, the heat-foamable sheet 3 heated at the temperature shown above shrinks in the direction of transport thereof, i.e., in the rolling direction (which may be hereinafter referred to as "shrinking direction B"), while it simultaneously extends in the extending direction A.

The extension ratio of the heat-foamable sheet 3 in the extending direction A is, e.g., 5 to 50%, preferably 10 to 30% in terms of the filling property thereof. When the extension ratio is less than 5%, the filling distance in the extending direction A is short so that the effect of improving the filing property deteriorates. When the extension ratio exceeds 50%, on the other hand, foaming in the shrinking direction B is reduced and sound proofness deteriorates. As shown in FIG. 2, the extension ratio is calculated in accordance with the following expression when a specimen is cut out of the heat-foamable sheet 3 and heated at 100 to 130° C. for 20 minutes. A specimen cut out for the evaluation of the extension ratio normally has a 100 (mm)×100 (mm) square configuration.

$$\text{Extension Ratio } (\%) = \{(L2(mm) - L1(mm))/L1(mm)\} \times 100$$

(wherein L2 (mm) is the post-heating length (mm) of the heat-foamable sheet 3 in the extending direction A and L1 (mm) is the pre-heating length (mm) of the heat-foamable sheet 3 in the extending direction A).

Figure 4:
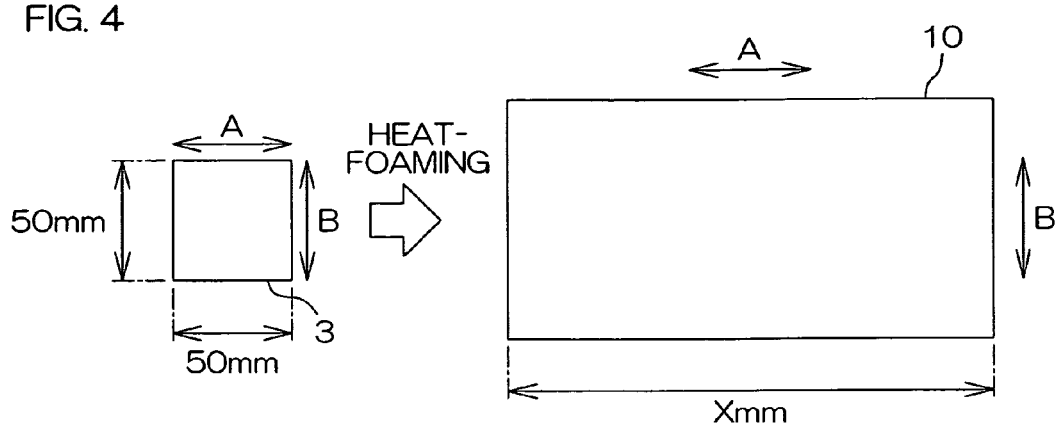
FIG. 4 is a plan view of a heat-foamable sheet which foams to greatly extend in the extending direction thereof with respect to the shrinking direction thereof, when heated at 160° C. for 20 minutes.

As shown as a specimen in FIG. 4, the heat-foamable sheet 3 foams to greatly extend in the extending direction A, while simultaneously shrinking in the shrinking direction B, when it is heated at, e.g., a temperature not less than the decomposition temperature of the foaming agent, more specifically at a temperature in the range of 160 to 220° C.

A filling distance X of the heat-foamable sheet 3 in the extending direction A is, e.g., 105 to 150 mm, preferably 110 to 130 mm. The filling distance X is calculated as the length (filling distance X (mm)) in the extending direction A of the foamed body when a specimen is cut out of the heat-foamable sheet 3 and heated at 160° C. for 20 minutes. A specimen cut out for the evaluation of the filling distance X normally has a 50 mm×50 mm square configuration.

Figure 3:
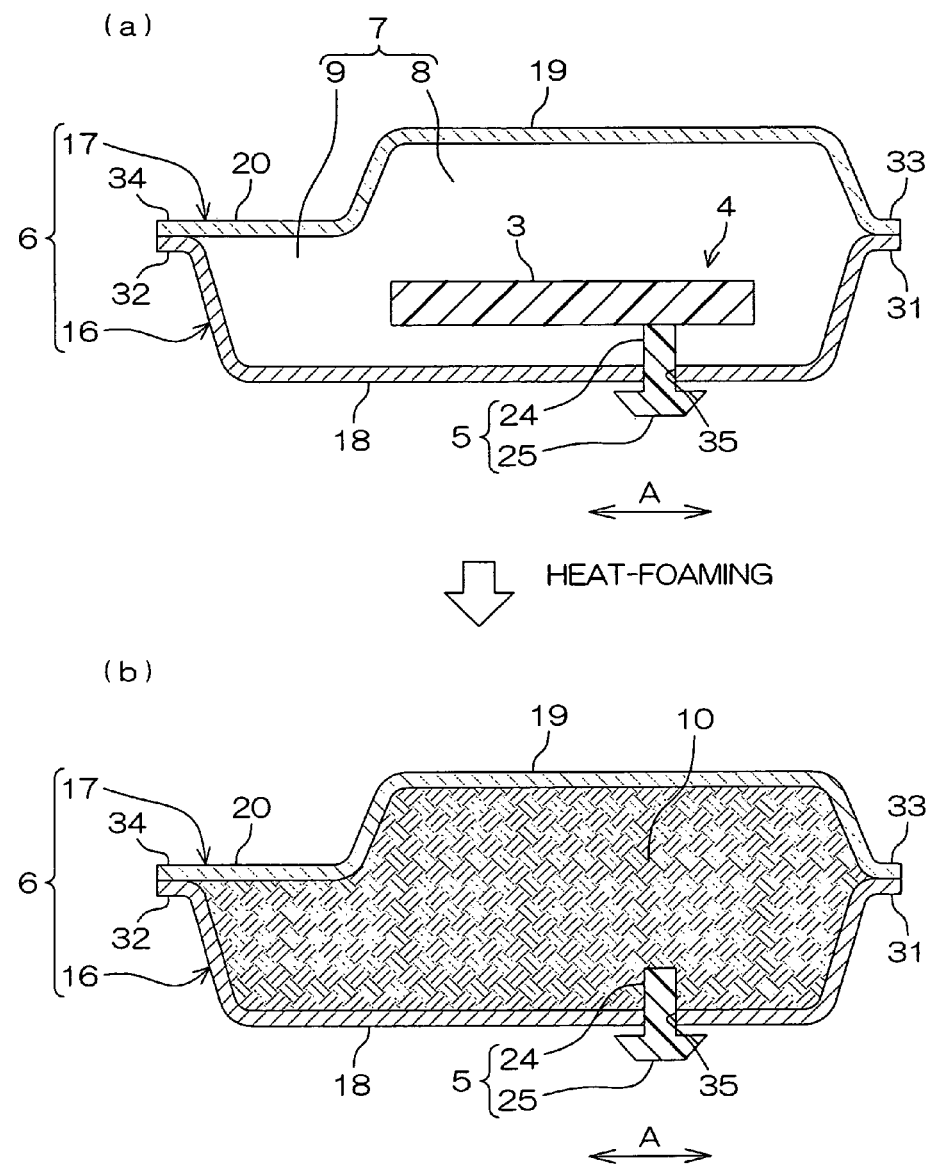
FIG. 3 is a view illustrating the process steps of a method for filling the inner space of a pillar by using a foaming filler member according to an embodiment, in which FIG. 3(*a*) illustrates the step of fabricating the foaming filler member by attaching a clip to the heat-foamable sheet and disposing the foaming filler member in the pillar, and FIG. 3(*b*) illustrates the step of heat-foaming, crosslinking, and curing the foaming filler member and thereby filling the inner space of the pillar with a foamed body.

FIG. 3 is a view illustrating the process steps of a method according to an embodiment for filling the inner space of a pillar by using a foaming filler member.

Next, referring to FIG. 3, a description will be given to a method for heat-foaming a foaming filler member 4 comprising the obtained heat-foamable sheet 3 and thereby filling an inner space 7 of a pillar 6.

As shown in FIG. 3, the foaming filler member 4 comprises the heat-foamable sheet 3 and a clip 5 attached to the heat-foamable sheet 3 to serve as a fixing member capable of fixing the heat-foamable sheet 3 in the inner space 7 of the pillar 6 as a hollow member.

The clip 5 is made of a hard resin and integrally includes a shaft-like fixing portion 24 for fixing the heat-foamable sheet 3 in the inner space 7 and a hook-shaped attachment portion 25 for attaching the fixing portion 24 to the pillar 6. The fixing portion 24 and the attachment portion 25 are integrally formed by injection molding or the like.

The foaming filler member 4 is fabricated by fitting the fixing portion 24 of the clip 5 into the heat-foamable sheet 3 cut out into an appropriate configuration by a machining process such as punching in accordance with the inner space 7 of the hollow member 6.

The pillar 6 comprises an inner panel 16 and an outer panel 17.

The inner panel 16 integrally includes an inner recessed portion 18 recessed downward and having a generally recessed configuration when viewed in frontal cross section, a right flange portion 31, and a left flange portion 32.

The outer panel 17 includes an outer recessed portion 19 protruding upward in vertically opposing relation to the right end and center portions of the inner recessed portion 18 of the inner panel 16 and having a generally recessed configuration when viewed in frontal cross section, a flat plate portion 20 configured as a flat plate continuously extending leftward from the left end portion of the outer recessed portion 19, a right flange portion 33, and a left flange portion 34. The right flange portion 31 of the inner panel 16 and the right flange portion 33 of the outer panel 17 are brought into opposing contact and bonded together by welding, while the left flange portion 32 of the inner panel 16 and the left flange portion 34 of the outer panel 17 are brought into opposing contact and bonded together by welding. As a result, the hollow space 7 of the pillar 6 is formed as a closed cross section. More specifically, such a pillar 6 is used for a front pillar, side pillar, or rear pillar of a vehicle body of an automobile.

The hollow space 7 is composed of a main space 8 defined by the inner recessed portion 18 and the right and center portions of the outer recessed portion 19 and a protruding space 9 defined by the flat plate portion 20 and the outer recessed portion 19. More specifically, in the inner space 7 of the pillar 6, the main space 8 and the protruding space 9 protruding leftward from the main space 8 are formed in mutually connecting relation.

As shown in FIG. 3(a), in this method the foaming filler member 4 is first disposed in the main space 8 such that the extending direction A of the heat-foamable sheet 3 is oriented toward the protruding space 9 in the inner space 7 of the pillar 6.

To dispose the foaming filler member 4 in the main space 8, the foaming filler member 4 is first positioned such that the extending direction A of the heat-foamable sheet 3 is oriented in the direction in which the right and left flange portions 31 and 32 of the inner panel 16 are opposed, while the clip 5 is fastened to the inner panel 16 by engaging the attachment portion 25 of the clip 5 with an attachment hole 35 in the inner panel 16. As a result, the foaming filler member 4 is fixed at a position in the inner recessed portion 18 which is opposed to the outer recessed portion 19, i.e., at the right and center portions of the inner recessed portion 18.

Next, the right flange portion 31 of the inner panel 16 and the right flange portion 33 of the outer panel 17 are brought into opposing contact relation and bonded together to the left flange portion 32 of the inner panel 16 and the left flange portion 34 of the outer panel 17 by welding, whereby the inner space 7 including the main space 8 and the protruding space 9 is formed. This allows the foaming filler member 4 to be disposed in the main space 8 such that the extending direction A of the heat-foamable sheet 3 is oriented toward the protruding space 9.

In this method then anti-corrosive treatment is performed to the inner circumferential surface of the pillar 6 and then the heat-foamable sheet 3 is formed, crosslinked and cured by performing a heating (e.g., 110 to 190° C.) process in a drying line step during subsequent bake-coating, thereby forming a foamed body 10 and filling the inner space 7 of the pillar 6 with the foamed body 10 without leaving a clearance therein, as shown in FIG. 3(b).

That is, in accordance with the method for filling the inner space 7 of the pillar 6, the heat-foamable sheet 3 extends in the extending direction A through heating. Therefore, even when the inner space 7 of the pillar 6 has the protruding space 9, the protruding space 9 can be easily filled with no clearance at low cost without using an extra member but by disposing the foaming filler member 4 in the main space 8 such that the extending direction A of the heat-foamable sheet 3 is oriented toward the protruding space 9.

Although the description has been given thus far by using the calender roll apparatus 1 having the four calender rolls arranged in the inverted L-shaped configuration, the calender roll apparatus used in the present invention is by no means limited to the calender roll apparatus 1 described above. The present invention is applicable to any calender roll apparatus in which, e.g., two to six rolls, preferably three or more rolls are arranged in a vertical configuration, a horizontal configuration, an inverted L-shaped configuration, an L-shaped configuration, a Z-shaped configuration, or an S-shaped configuration according to a known embodiment. The diameter and width of each of the calender rolls can also be selected appropriately depending on the purpose and application thereof.

Although the foaming filler member 4 comprises the heat-foamable sheet 3 and the clip 5 in the description given above, the foaming filler member 4 according to the present invention is not limited thereto. For example, the foaming filler member 4 may also be formed only from the heat-foamable sheet 3 without attaching the clip 5 thereto.

Although the heat-foamable sheet 3 described above has been stretch-formed by calendering, the stretching method is not particularly limited. It is also possible to draw off the sheet-shaped heat-foamable material 2 extruded from an extruder by using the draw roll without performing an additional machining process.

EXAMPLES

Fabrication of Heat-Foamable Sheet

As the polymer, 100 parts by weight of an ethylene-vinyl acetate copolymer (EVAFLEX EV460 commercially available from Du PONT-MISUI POLYCHEMICALS CO., LTD. and having a melting point of 84° C., an MFR of 2.5, and a vinyl acetate content of 19%) was used and kneaded at 90° C. for 5 minutes by using a press kneader at a number of revolutions of 20 min$^{-1}$. Then, the ethylene-vinyl acetate copolymer was mixed with 5 parts by weight of dicumyl peroxide (PERCUMYL D-40MBK commercially available from NOF CORPORTION and having a dicumyl peroxide content of 40%, and a silica and EPDM content of 60%) as a crosslinking agent, 20 parts by weight of 4,4'-oxybis (benzensulfonyl-hydrazide) (CELLMIC SX commercially available from SANKYO KASEI CO., LTD and having a decomposition temperature of 160° C.) as a foaming agent, and 1 part by weight of stearic acid as a lubricant. By further kneading the mixture at 90° C. for 5 minutes, a heat-foamable material was prepared.

Then, the heat-foamable material was rolled by using the calender roll apparatus shown in FIG. 1 under the rolling conditions (the surface temperatures and rotating speeds of the calender rolls) shown in Table 1, whereby heat-foamable sheets each having a thickness of 3 mm were formed in Examples and Comparative Examples. The heat-foamable sheet according to Comparative Example 3 was formed by pressing at 90° C. the heat-foamable material prepared by using the press kneader.

(Evaluation of Heat-Foamable Sheets)

(Extension Ratio)

Figure 2:
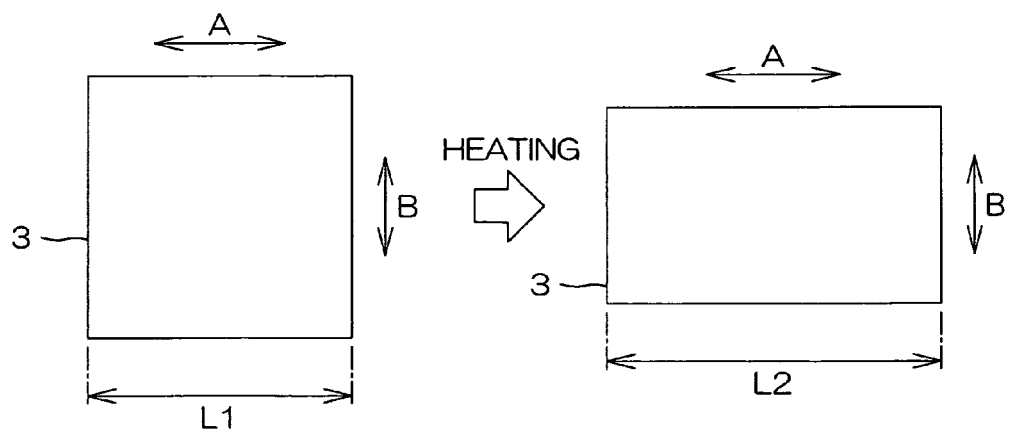
FIG. 2 is a plan view of the heat-foamable sheet which extends in the extending direction thereof when heated at 100 to 130° C. for 20 minutes.

As shown in FIG. 2, specimens each having a 100 mm×100 mm square configuration were cut out of the heat-foamable sheets obtained. These specimens were heated at 120° C. for 20 minutes and the respective extension ratios thereof were calculated.

(Filling Distance)

As shown in FIG. 4, specimens each having a 50 mm×50 mm square configuration were cut out of the heat-foamable sheets obtained. These specimens were heated at 160° C. for 20 minutes to be foamed and crosslinked, resulting in foamed bodies. The length (filling distance X (mm)) of each of the foamed bodies was calculated. The heat-foamable sheets heated at the temperature shown above foamed to greatly extend in the extending direction with respect to the shrinking direction.

(Foaming Ratio)

Specimens each having a 30 mm×30 mm square configuration were cut out of the heat-foamable sheets obtained. These specimens were heated at 160° C. for 20 minutes and the respective foaming ratios thereof were calculated in accordance with the following expression.

Foaming Ratio=(Pre-Foaming Density)/(Post-Foaming Density)

(Fabrication of Foaming Filler Members)

Figure 6:
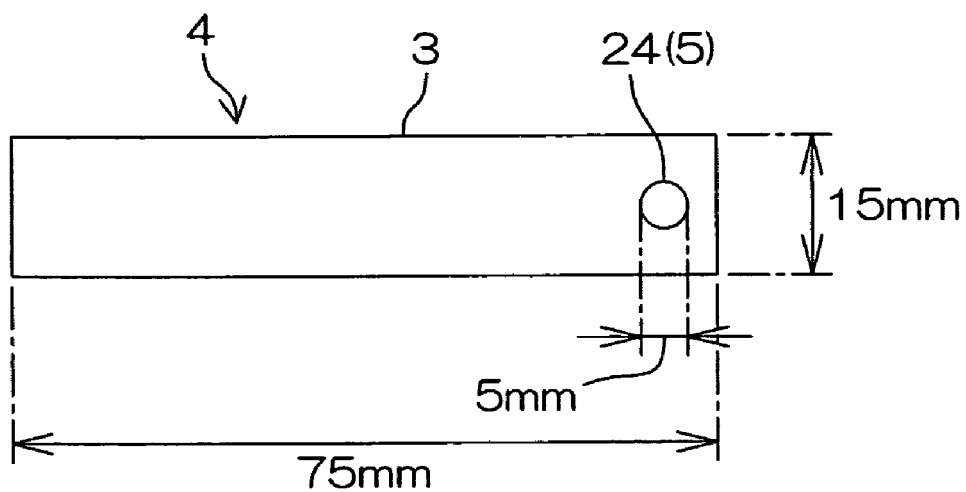
FIG. 6 is a plan view of the foaming filler member composed of the heat-foamable sheet with the clip attached thereto.

As shown in FIG. 6, specimens each having a 15 mm×75 mm rectangular configuration were cut out of the heat-foamable sheets obtained and then holes for clip (φ 5 mm) were formed in the respective right end portions thereof. Clips each made of 6,6-nylon were attached to the specimens by engaging the respective fixing portions (φ 5 mm) thereof with the individual holes for clip in the specimens.

(Evaluation of Foaming Filler Members)

(Filling Property)

Figure 5:
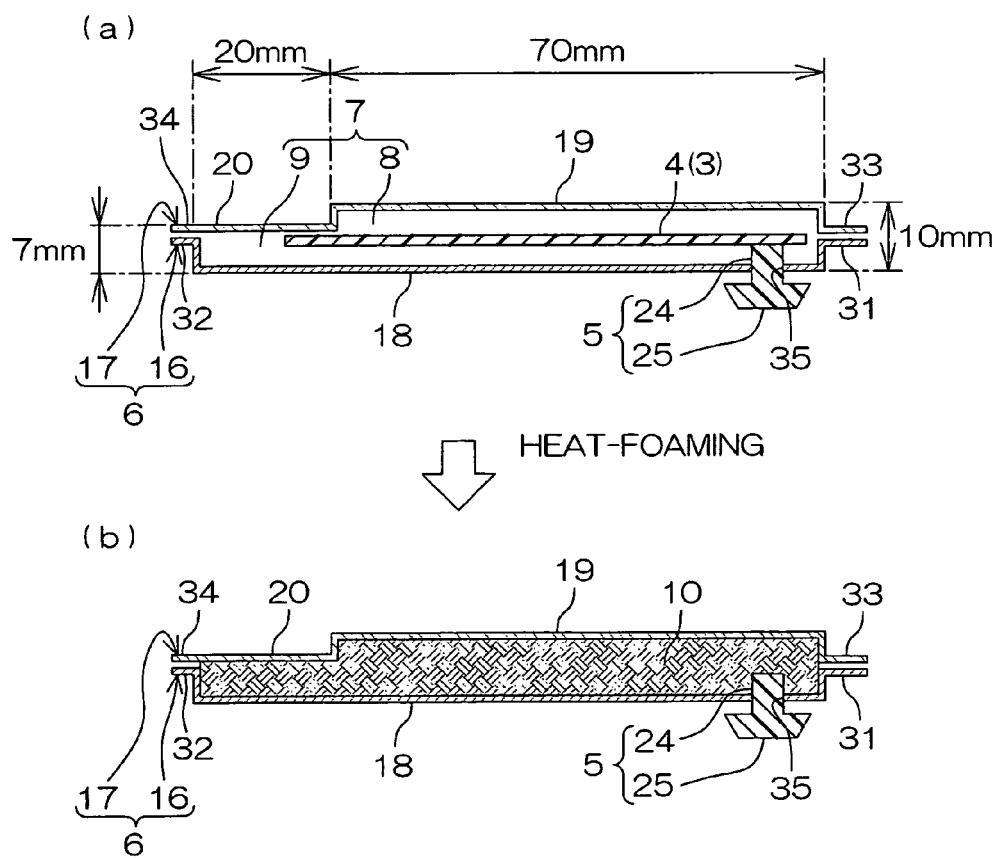
FIG. 5 is a view illustrating the process steps of a method for filling the inner space of a model pillar by using the foaming filler member, in which FIG. 5(*a*) illustrates the step of disposing the foaming filler member in the model pillar, and FIG. 5(*b*) illustrates the step of heat-foaming and crosslinking the foaming filler member and thereby filling the inner space of the model pillar with the foamed body.

First, as shown in FIG. 5(a), model pillars each having a 10 mm×70 mm main space and a 7 mm×20 mm protruding space as a closed cross section were fabricated.

Then, the foaming filler members fabricated as described above were disposed in the respective main spaces of the model pillars by securing the respective attachment portions of the clips to the inner pillars such that the extending directions of the heat-foamable sheets are oriented in the directions in which the both end portions of the model pillars were opposed. The foaming filler members were disposed such that the left end portions of the heat-foamable sheets slightly faced the protruding spaces.

Then, as shown in FIG. 5(b), the model pillars in which the foaming filler members were disposed were heated in an oven at 160° C. for 20 minutes so that the heat-foamable sheets foamed. Then, after cooling, the model pillars were disassembled and the filling properties of the foamed bodies were visually evaluated. In Table 1, "O" indicates a superior filling property and "Δ" indicates a slightly inferior filling property.

TABLE 1

| Examples/ Comparative Examples | Rolling Conditions of Calender Roll Apparatus | | | | | | | | | Evaluation | | | |
|---|---|---|---|---|---|---|---|---|---|---|---|---|---|
| | Surface Temperature (° C.) Calender Rolls | | | | Rotating Speed (m/min.) Calender Rolls | | | | Draw Roll | Extension Ratio (%) | Filling Distance (mm) | Foaming Ratio | Filling Property |
| | First | Second | Third | Fourth | First | Second | Third | Fourth | | | | | |
| Example 1 | 87 | 88 | 88 | 87 | 2.5 | 2.7 | 3.0 | 3.0 | 3.0 | +26 | 126 | 15.9 | O |
| Example 2 | 98 | 98 | 99 | 98 | 2.5 | 2.7 | 3.0 | 3.0 | 3.0 | +20 | 120 | 15.5 | O |
| Example 3 | 98 | 98 | 99 | 98 | 2.5 | 2.7 | 3.0 | 3.0 | 2.5 | +17 | 115 | 15.6 | O |
| Example 4 | 108 | 107 | 110 | 108 | 2.5 | 2.7 | 3.0 | 3.0 | 3.0 | +18 | 117 | 16.5 | O |
| Example 5 | 108 | 107 | 110 | 108 | 2.5 | 2.7 | 3.0 | 3.0 | 2.5 | +14 | 113 | 16.1 | O |
| Example 6 | 108 | 107 | 110 | 108 | 2.5 | 2.7 | 3.0 | 3.0 | 3.5 | +24 | 123 | 16.0 | O |
| Comp. Example 1 | 80 | 79 | 78 | 78 | 2.5 | 2.7 | 3.0 | 3.0 | 3.0 | No formation of flat and smooth sheet | | | |
| Comp. Example 2 | 119 | 120 | 121 | 121 | 2.5 | 2.7 | 3.0 | 3.0 | 3.0 | +4 | 108 | 16.2 | Δ |
| Comp. Example 3 | 90* | | | | — | | | | | −13 | 75 | 16.0 | Δ |

*Temperature during Press-Forming (Comparative Example 3)

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A method of filling an inner space of a hollow member by heat-foaming a foaming filler member, wherein the inner space of the hollow member has a main space and a protruding space protruding from the main space which are formed in mutually connecting relation, such that the inner space is asymmetric, and the foaming filler member consisting of a one-piece, heat-foamable sheet with a single homogeneous layer which extends in an extending direction and shrinks in an orthogonal direction to the one-extending direction when heated at 100 to 130° C. for 20 minutes and has an extension ratio of 5 to 50% in the extending direction, the method comprising:

disposing the heat-foamable sheet in the main space such that a distance between a side of the heat-foamable sheet facing the protruding space and an inner wall of the hollow member is greater than a distance between an opposite side of the heat-foamable sheet facing the main space and the inner wall of the hollow member, and such that the extending direction of the heat-foamable sheet is oriented toward the protruding space; and heating the heat-foamable sheet at 160 to 220° C. such that the heat-foamable sheet foams to extend more greatly in the one extending direction than in the orthogonal direction.

* * * * *